(12) United States Patent
Saint-Pierre et al.

(10) Patent No.: US 8,284,240 B2
(45) Date of Patent: Oct. 9, 2012

(54) SYSTEM FOR ADAPTIVE THREE-DIMENSIONAL SCANNING OF SURFACE CHARACTERISTICS

(75) Inventors: Éric Saint-Pierre, Lévis (CA); Dragan Tubic, Des Cîmes (CA); Patrick Hebert, rue Lalonde (CA)

(73) Assignee: Creaform Inc., Levis, Quebec (CA)

( * ) Notice: Subject to any disclaimer, the term of this patent is extended or adjusted under 35 U.S.C. 154(b) by 0 days.

(21) Appl. No.: 13/055,030

(22) PCT Filed: Jul. 30, 2009

(86) PCT No.: PCT/CA2009/001105
§ 371 (c)(1),
(2), (4) Date: Jan. 20, 2011

(87) PCT Pub. No.: WO2010/015086
PCT Pub. Date: Feb. 11, 2010

(65) Prior Publication Data
US 2011/0134225 A1    Jun. 9, 2011

Related U.S. Application Data

(60) Provisional application No. 61/086,554, filed on Aug. 6, 2008.

(51) Int. Cl.
*H04N 15/00* (2006.01)

(52) U.S. Cl. ............... 348/47; 348/42; 382/154

(58) Field of Classification Search ........... 348/25–172, 348/384.1–440.1, 699–702, 818–843; 382/154; H04N 03/02, 03/36, 03/40, 05/14, 05/20, H04N 05/30, 05/33, 05/38, 05/64, 05/72, H04N 05/89, 05/225, 05/253, 05/257, 05/335, H04N 05/665, 07/00, 07/12, 07/14, 07/18, H04N 09/10, 09/11, 09/43, 09/47, 09/64, H04N 09/74, 11/00, 11/02, 11/04, 13/00, H04N 13/04, 15/00; A61B 01/04, 01/06; G01S 15/89; G09B 09/00
See application file for complete search history.

(56) References Cited

U.S. PATENT DOCUMENTS
5,410,141 A    4/1995   Koenck et al.
(Continued)

FOREIGN PATENT DOCUMENTS
DE    19502459    8/1996
(Continued)

OTHER PUBLICATIONS

Dragan Tubić, Patrick Hébert, Denis Laurendeau, 3D surface modeling from curves, Image and Vision Computing, vol. 22, Issue 9, Aug. 20, 2004, pp. 719-734, ISSN 0262-8856, 10.1016/j.imavis.2004.03.006. (http://www.sciencedirect.com/science/article/pii/S0262885604000599).*

Alshawabkeh Y.,2005. Using Terrestrial Laser Scanning for the 3D Reconstruction of Petra—Jordan. Photogrammetric Week '05, Wichmann, pp. 39-48.*

Dragan Tubi6, Patrick Hebert, Denis Laurendeau, 3D surface modeling from curves, Image and Vision Computing, vol. 22, Issue 9, Aug. 20, 2004, pp. 719-734, ISSN 0262-8856, 10.1016/j.imavis.2004.03.006. (http://www.sciencedirect.com/science/article/pii/S0262885604000599).*

(Continued)

*Primary Examiner* — Jay Patel
*Assistant Examiner* — Jessica Prince
(74) *Attorney, Agent, or Firm* — Fasken Martineau

(57) ABSTRACT

There are provided systems and methods for obtaining a three-dimensional surface geometric characteristic and/or texture characteristic of an object. A pattern is projected on a surface of said object. A basic 2D image of said object is acquired; a characteristic 2D image of said object is acquired; 2D surface points are extracted from said basic 2D image, from a reflection of said projected pattern on said object; a set of 3D surface points is calculated in a sensor coordinate system using said 2D surface points; and a set of 2D surface geometric/texture characteristics is extracted.

18 Claims, 6 Drawing Sheets

U.S. PATENT DOCUMENTS

| | | | |
|---|---|---|---|
| 5,936,628 A * | 8/1999 | Kitamura et al. | 345/420 |
| 6,028,672 A * | 2/2000 | Geng | 356/602 |
| 6,341,016 B1 | 1/2002 | Malione | |
| 6,508,403 B2 | 1/2003 | Arsenault et al. | |
| 6,542,249 B1 | 4/2003 | Kofman et al. | |
| 7,487,063 B2 | 2/2009 | Tubic et al. | |
| 7,929,751 B2 * | 4/2011 | Zhang et al. | 382/154 |
| 2002/0041282 A1 | 4/2002 | Kitaguchi et al. | |
| 2003/0160970 A1 * | 8/2003 | Basu et al. | 356/601 |
| 2004/0052974 A1 * | 3/2004 | Ogawa et al. | 427/569 |
| 2005/0174579 A1 | 8/2005 | Notni et al. | |
| 2007/0052974 A1 * | 3/2007 | Tubic et al. | 356/604 |
| 2007/0229850 A1 * | 10/2007 | Herber | 356/604 |
| 2008/0201101 A1 | 8/2008 | Hebert et al. | |
| 2010/0074532 A1 * | 3/2010 | Gordon et al. | 382/203 |
| 2012/0063672 A1 * | 3/2012 | Gordon et al. | 382/154 |

FOREIGN PATENT DOCUMENTS

| | | |
|---|---|---|
| DE | 19634254 | 3/1997 |
| DE | 19925462 | 2/2001 |
| JP | 04172213 | 6/1992 |
| JP | 07012534 | 1/1995 |
| JP | 11101623 | 4/1999 |
| JP | 2001119722 | 4/2001 |
| WO | 0114830 | 3/2001 |
| WO | 0169172 | 9/2001 |
| WO | 03062744 | 7/2003 |
| WO | 2006094409 | 9/2006 |
| WO | WO2006094409 A1 * | 9/2006 |
| WO | WO 2006094409 A1 * | 9/2006 |

OTHER PUBLICATIONS

Alshawabkeh Y., 2005. Using Terrestrial Laser Scanning for the 3D Reconstruction of Petra—Jordan. Photogrammetric Week '05, Wichmann, pp. 39-48.*

Dragan Tubi6, Patrick Hebert, Denis Laurendeau, 3D surface modeling from curves, Image and Vision Computing, vol. 22, Issue 9, 20 Aug. 2004, pp. 719-734, ISSN 0262-8856, 10.1016/j.imavis.2004.03.006.(http://www.sciencedirect.com/science/article/pii/S0262885604000599).*

E. Trucco et al., Introductory techniques for 3-D computer vision, Prentice Hall, 1998, p. 101-108.

P. Hébert, "A Self-Referenced Hand-Held Range Sensor", in proc. of the 3rd International Conference on 3D Digital Imaging and Modeling (3DIM2001), May 28-Jun. 1, 2001, Québec City, Canada, pp. 5-12.

M. Fischler et al., "Random sample consensus: A paradigm for model fitting with applications to image analysis and automated cartography", Communications of the Assoc. for Computing Machinery, Jun. 1981, vol. 24, No. 6, pp. 381-395.

M. W. Walker et al., "Estimating 3-D location parameters using dual number quaternions", CVGIP: Image Understanding, Nov. 1991, vol. 54, No. 3, pp. 358-367.

T.P. Koninckx et al., "Scene-Adapted Structured Light", in proc. of Computer Vision and Pattern Recognition (CVPR 2005), 2005, San Diego, USA, vol. 2, pp. 611-618.

S. Rusinkiewicz, et al., "Real-time 3D model acquisition" in proc. of ACM SIGGRAPH Jul. 2002, San Antonio, USA, vol. 21, No. 3, pp. 438-446.

D. Tubic et al., "3D surface modeling from curves", Image and Vision Computing, Aug. 2004, vol. 22, No. 9, pp. 719-734.

P. E. Debevec et al., "Recovering High Dynamic Range Radiance Maps from Photographs", in proc. of ACM SIGGRAPH 1997, Los Angeles, USA, pp. 369-378.

B. Curless et al., "A Volumetric Method for Building Complex Models from Range Images", in proc. of the ACM SIGGRAPH 1996, New Orleans, USA, pp. 303-312.

W. E. Lorensen et al., "Marching Cubes: A High Resolution 3D Surface Construction Algorithm", in proc. of the ACM SIGGRAPH 87, Los Angeles, USA, vol. 21, No. 4, pp. 163-170.

Carsten Reich et al., "3-D shape measurement of complex objects by combining photogrammetry and fringe projection", Optical Engineering, Society of Photo-Optical Instrumentation Engineers, vol. 39 (1) Jan. 2000, pp. 224-231, USA.

F. Blais, "A Review of 20 Years of Range Sensor Development", in proceedings of SPIE-IS&T Electronic Imaging, SPIE vol. 5013, 2003, pp. 62-76.

F. Blais et al., "Accurate 3D Acquisition of Freely Moving Objects", in proc. of the Second International Symposium on 3D Data Processing, Visualization and Transmission, Sep. 6-9, 2004, NRC 47141, Thessaloniki, Greece.

J.Y. Bouguet et al., "3D Photography Using Shadows in Dual-Space Geometry", Int. Journal of Computer Vision, vol. 35, No. 2, Nov.-Dec. 1999, pp. 129-149.

D. Tubic et al., "3D Surface Modeling from Range Curves", Proceedings of the 2003 IEEE Computer Society Conference on Computer Vision and Pattern Recognition (CVPR'03), 1063-6919/03.

* cited by examiner

SYSTEM FOR ADAPTIVE THREE-DIMENSIONAL SCANNING OF SURFACE CHARACTERISTICS

CROSS-REFERENCE TO RELATED APPLICATIONS

The present application is a national phase entry of PCT Application No. PCT/CA2009/001105, entitled "System For Adaptive Three-Dimensional Scanning Of Surface Characteristics", filed on Jul. 30, 2009; which in turn claims priority of U.S. provisional patent application No. 61/086,554 filed on Aug. 6, 2008 by Applicant, the specifications of which are hereby incorporated by reference.

TECHNICAL FIELD

The present description generally relates to the field of three-dimensional scanning of an object's surface geometry.

BACKGROUND OF THE ART

In order to build a geometric model of an object's surface, range sensors have been developed. These sensors measure the distance between the sensor and the surface at a collection of points. For close range measurements, triangulation-based laser range sensors are typically used. Then, the partial or whole surface shape of an object can be modeled from measurements collected from a plurality of viewpoints. For that purpose, the relative positions between the sensor and the object should be determined before integrating the range measurements into a common global coordinate system. One can use an external positioning device or integrate auto-referencing within the sensing device. For instance, in International Patent Application published under no. WO 2006/094409A1, P. Hébert et al., describe an auto-referenced hand-held range sensor integrating a laser pattern projector and two cameras that simultaneously capture the image of the laser pattern and that of retro-reflective target features. These retro-reflective features are used for the auto-referencing and are illuminated using LEDs whose spectral band matches with the spectral band of the laser pattern projector. Based on the observation of these features, the system combines laser triangulation with the principles of photogrammetry for auto-referencing.

Compact for hand-held operations, the system builds incrementally and simultaneously a model of the 3D position of the target features for matching and calculating the current position of the range sensor while reconstructing the geometry of the surface.

Using such a system does not allow one to capture the color texture of the object's surface. One could first build the 3D model of the object's surface, and then use a color camera to collect images of the object's surface that could be aligned with the model before merging and integrating them into a textured model representation. However, such an approach would require two systems without providing a capability of building a complete model incrementally while scanning.

Another limitation of known systems is related to the resolution of the recovered model. Since the cameras are used for positioning, a wide field of view is required. Conversely, for recovering higher resolution of an object's surface shape, namely its geometry, a smaller surface section should map to a larger number of pixels in the images. Consequently, there is a compromise between positioning and the recovered resolution of the geometry.

SUMMARY

There are provided systems and methods that allow for incrementally capturing the two characteristics of surface texture and geometry of an object with a maneuverable laser range sensor. Moreover, the systems and methods further allow for capturing such characteristics at fine resolution while preserving an auto-referencing capability.

In order to make it possible to capture the surface texture concurrently with the geometry of an object while providing automatic alignment of colored images, one might consider replacing the cameras of the system described in the prior art with color cameras. One would face many difficulties including the replacement of visibly colored illumination by the LEDs (typically red illumination, the LEDs spectral band matching with the spectral band of the laser pattern projector) with white light illumination, the minimization of surface highlights while scanning, and the interference between the monochromic light of the laser nearby sections where the texture must be recovered. In addition, one should develop an incremental approach for integrating the texture into the surface model while scanning. Even after proposing a new system and methods for resolving these problems, the resolution of the texture and geometric characteristics would still be limited due to the aforementioned compromise between positioning and the resolution of the measured characteristics.

There are provided systems and methods for obtaining a three-dimensional surface geometric characteristic and/or texture characteristic of an object. A pattern is projected on a surface of said object. A basic 2D image of said object is acquired; a characteristic 2D image of said object is acquired; 2D surface points are extracted from said basic 2D image, from a reflection of said projected pattern on said object; a set of 3D surface points is calculated in a sensor coordinate system using said 2D surface points; and a set of 2D surface geometric/texture characteristics is extracted.

According to one broad aspect of the present invention, there is provided a system for obtaining data representing surface points of an object. The system comprises a sensing device having a pattern projector for providing a projected pattern on a surface of the object, at least one basic camera for acquiring data representing a basic 2D image of at least a portion of the object, and a characteristic camera for acquiring data representing a characteristic image of at least a portion of the object, the projected pattern being apparent on the basic image, a spatial relationship of the basic camera, the pattern projector and the characteristic camera in a sensor coordinate system being known; a basic image processor for extracting, from the basic 2D image data, data representing at least one set of 2D surface points provided from a reflection of the projected pattern on the surface; a 3D surface point calculator for calculating a set of 3D surface points in the sensor coordinate system using the data representing set of 2D surface points; a characteristic image processor for mathematically projecting the set of 3D surface points onto the characteristic image data to obtain a location of the 3D surface points in the characteristic image data and for extracting characteristic data for the set of 3D surface points at a short distance from the projected 3D surface points in the characteristic image data.

In one embodiment, the characteristic camera is a texture camera, the characteristic image is a texture image, the characteristic image processor comprises a texture image processor and the characteristic data is texture data obtained in texture patches.

In one embodiment, the characteristic camera is a high resolution camera, the characteristic image is a high resolution 2D image, the characteristic image processor comprises a high resolution image processor, and the characteristic data is high resolution 2D surface points.

According to another broad aspect of the present invention, there is provided a method for obtaining data representing surface points of an object. The method comprises obtaining data representing a basic 2D image of at least a portion of the object using at least one basic camera, a projected pattern being apparent on the basic image; obtaining data representing a characteristic image of at least a portion of the object using a characteristic camera; extracting, from the basic 2D image data, data representing at least one set of 2D surface points provided from a reflection of the projected pattern on the surface; calculating a set of 3D surface points in the sensor coordinate system using the data representing set of 2D surface points; and mathematically projecting the set of 3D surface points onto the characteristic image data to obtain a location of the 3D surface points in the characteristic image data; extracting characteristic data for the set of 3D surface points at a short distance from the projected 3D surface points in the characteristic image data.

In one embodiment, the basic 2D image and the characteristic image are obtained using a sensing device having a pattern projector for providing the projected pattern on the surface of the object, at least one basic camera for acquiring a basic 2D image of the object, and a characteristic camera for acquiring a characteristic image of the object, a spatial relationship of the basic camera, the pattern projector and the characteristic camera in a sensor coordinate system being known.

According to another aspect, there are provided systems and methods using an additional color camera with a higher focal length lens to capture a characteristic image, together with a tight coupling with the range sensor. Basic images captured by the range sensor for low resolution geometry measurements are used for guiding the extraction of the surface texture in the characteristic image. The additional camera may also be monochromic (i.e. gray scale) and used to capture high resolution geometry on the object. Similarly, basic images are used for guiding the extraction of the high resolution characteristics. More generally, when capturing the two characteristics at high resolution, both the geometric and color texture resolutions can be adapted independently while modeling the object's surface.

According to another aspect, there is provided a system for obtaining three-dimensional surface points of an object. The system comprises a sensing device having a pattern projector for providing a projected pattern on a surface of said object, at least one basic camera for acquiring a basic 2D image on said object, and a characteristic camera for acquiring a high resolution 2D image on said object. The projected pattern is apparent on said basic image, and a reference between said basic camera and said pattern projector and a reference between said basic camera and said characteristic camera are known. The system further comprises an image processor, a 3D surface point calculator and a high resolution image processor. The image processor extracts, from said basic 2D image, at least one set of 2D surface points provided from a reflection of said projected pattern on said surface. The 3D surface point calculator calculates a set of 3D surface points in a sensor coordinate system using said set of 2D surface points. The high resolution image processor projects said set of 3D surface points onto said high resolution 2D image to calculate at least one set of 2D high resolution surface points from the high resolution 2D image.

According to another aspect, there is provided a system for obtaining three-dimensional surface points and a texture of an object. The system comprises a sensing device having a pattern projector for providing a projected pattern on a surface of said object, at least one basic camera for acquiring a basic 2D image on said object, and a characteristic camera for acquiring a texture image on said object. The projected pattern is apparent on said basic image, and a reference between said basic camera and said pattern projector and a reference between said basic camera and said characteristic camera are known. The system further comprises an image processor, a 3D surface point calculator and a texture image processor. The image processor extracts, from said basic 2D image, at least one set of 2D surface points provided from a reflection of said projected pattern on said surface. The 3D surface point calculator calculates a set of calculated 3D surface points in a sensor coordinate system using said set of 2D surface points. The texture image processor projects said set of 3D surface points onto said texture image to calculate at least one set of texture patches from the texture image.

According to another aspect, there is provided a system for obtaining three-dimensional surface points of an object. The system comprises a sensing device having a pattern projector for providing a projected pattern on a surface of said object, at least one basic camera for acquiring a basic 2D image on said object, and a characteristic camera for acquiring a characteristic 2D image on said object with high resolution. The projected pattern is apparent on said basic image, and a reference between said basic camera and said pattern projector and a reference between said basic camera and said characteristic camera are known. The system further comprises: a basic image processor for extracting, from said basic 2D image, at least one set of 2D surface points provided from a reflection of said projected pattern on said surface; a 3D surface point calculator for calculating a set of 3D surface points in a sensor coordinate system using said set of 2D surface points; a high resolution image processor for projecting said set of 3D surface points onto said characteristic 2D image to obtain a set of projected surface points and calculate at least one set of 2D high resolution surface points from the characteristic 2D image; a texture image processor for calculating at least one set of texture patches from the characteristic 2D image and using the set of projected surface points; a 3D positioning calculator for calculating transformation parameters indicative of a relation between said sensor coordinate system and a global reference frame, for referencing a position of said sensing device in said global reference frame; a 3D surface point transformer for transforming said set of 3D surface points in the sensor coordinate system into a set of transformed 3D surface points in said global reference frame using said transformation parameters; a local tangent plane calculator for calculating a set of local tangent planes from the set of transformed 3D surface points in the global reference frame; a texture integrator for mapping and accumulating the set of texture patches onto the set of local tangent planes to produce a set of local textured tangent planes; and a surface reconstructor for cumulating the set of transformed 3D surface points to provide a 3D surface model of said object and for mapping the set of local textured tangent planes onto the 3D surface model.

According to another aspect, there is provided a method for obtaining three-dimensional surface points of an object. A projected pattern is provided on a surface of said object. A basic 2D image of said object is acquired. The projected pattern is apparent on said images, and a reference between said basic 2D image and said projected pattern is known. A high resolution 2D image of said object is acquired. A reference between said basic 2D image and said high resolution 2D image is known. From said basic 2D image, at least one set of 2D surface points is extracted from a reflection of said projected pattern on said surface. A set of 3D surface points in a sensor coordinate system is calculated using said set of 2D surface points. The set of 3D surface points is projected onto said high resolution 2D image to calculate at least one set of 2D high resolution surface points from the high resolution 2D image.

According to another aspect, there is provided a method for obtaining three-dimensional surface points and a texture of an object. A projected pattern is provided on a surface of said object. A basic 2D image of said object is acquired. The projected pattern is apparent on said images, and a reference between said basic 2D image and said projected pattern is known. A texture 2D image of said object is acquired. A reference between said basic 2D image and said texture 2D image is known. From said basic 2D image, at least one set of 2D surface points is extracted from a reflection of said projected pattern on said surface. A set of 3D surface points in a sensor coordinate system is calculated using said set of 2D surface points. The set of 3D surface points is projected onto said texture 2D image to calculate at least one set of 2D texture patches from the texture image.

BRIEF DESCRIPTION OF THE DRAWINGS

It is noted that throughout the drawings, like features are identified by like reference numerals.

DETAILED DESCRIPTION

Figure 1:
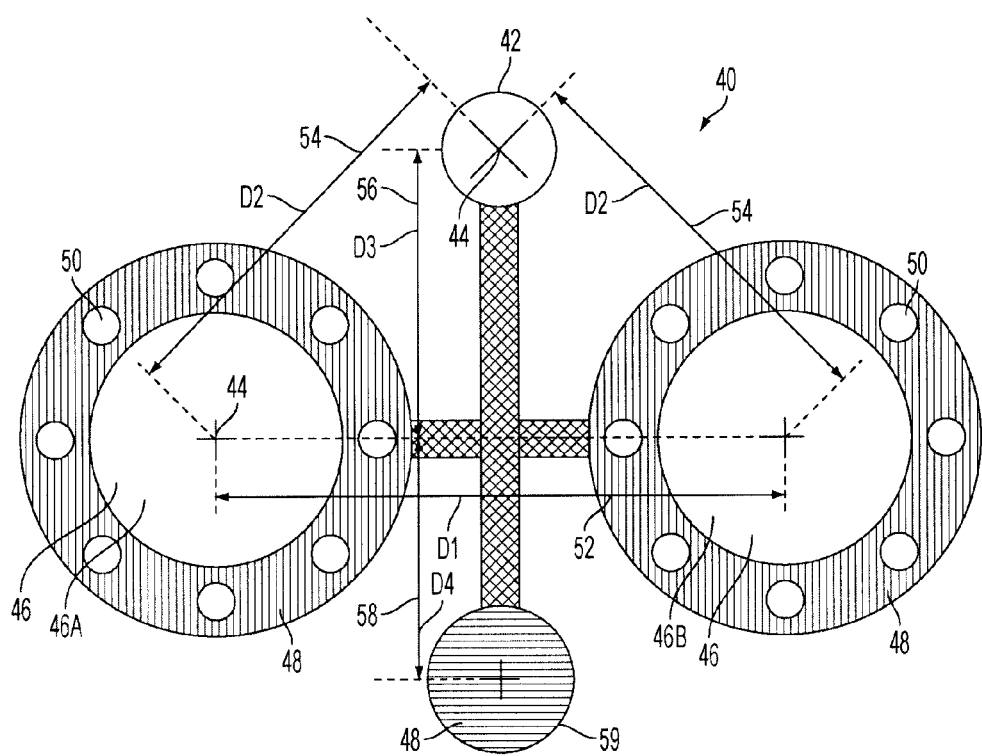
FIG. 1 depicts a configuration of an apparatus for three-dimensional surface scanning.
Figure 2:
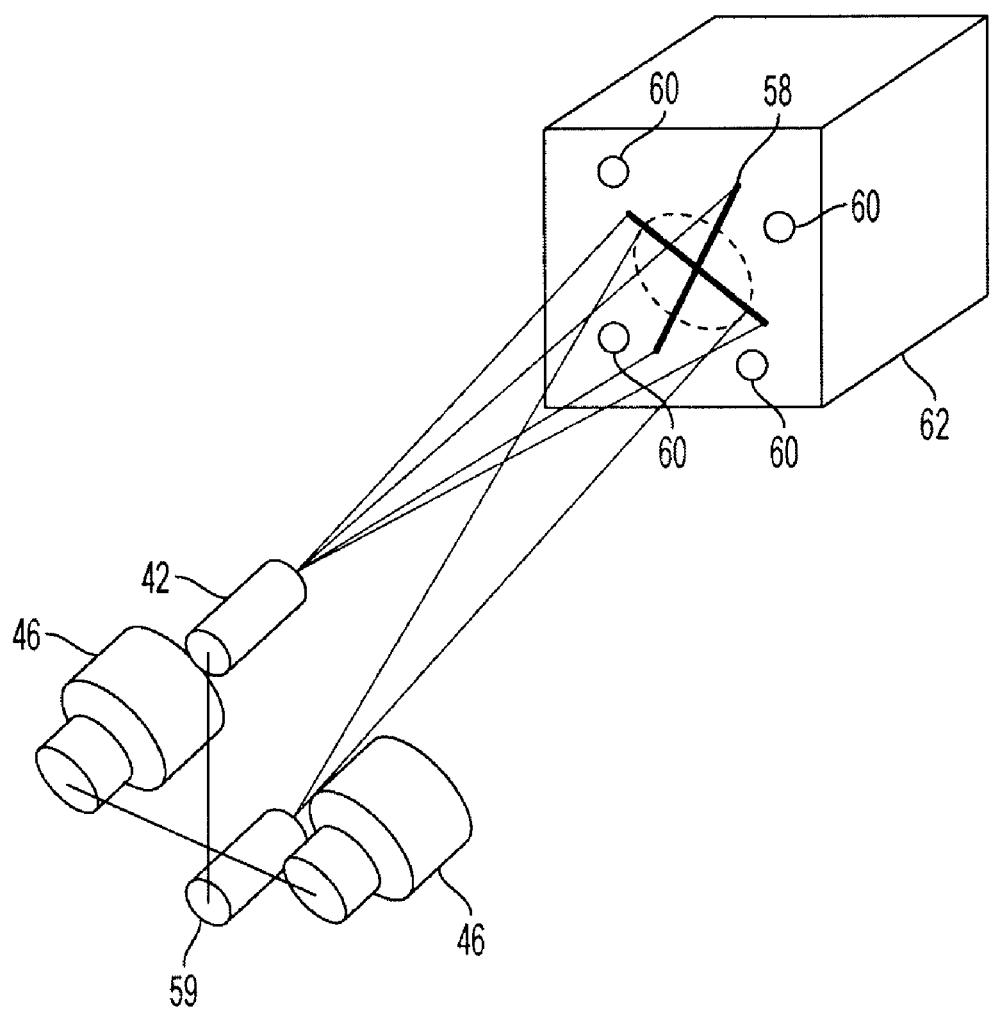
FIG. 2 illustrates a configuration of the apparatus depicted in FIG. 1 in use and along with the object to be measured during acquisition.
Figure 3:
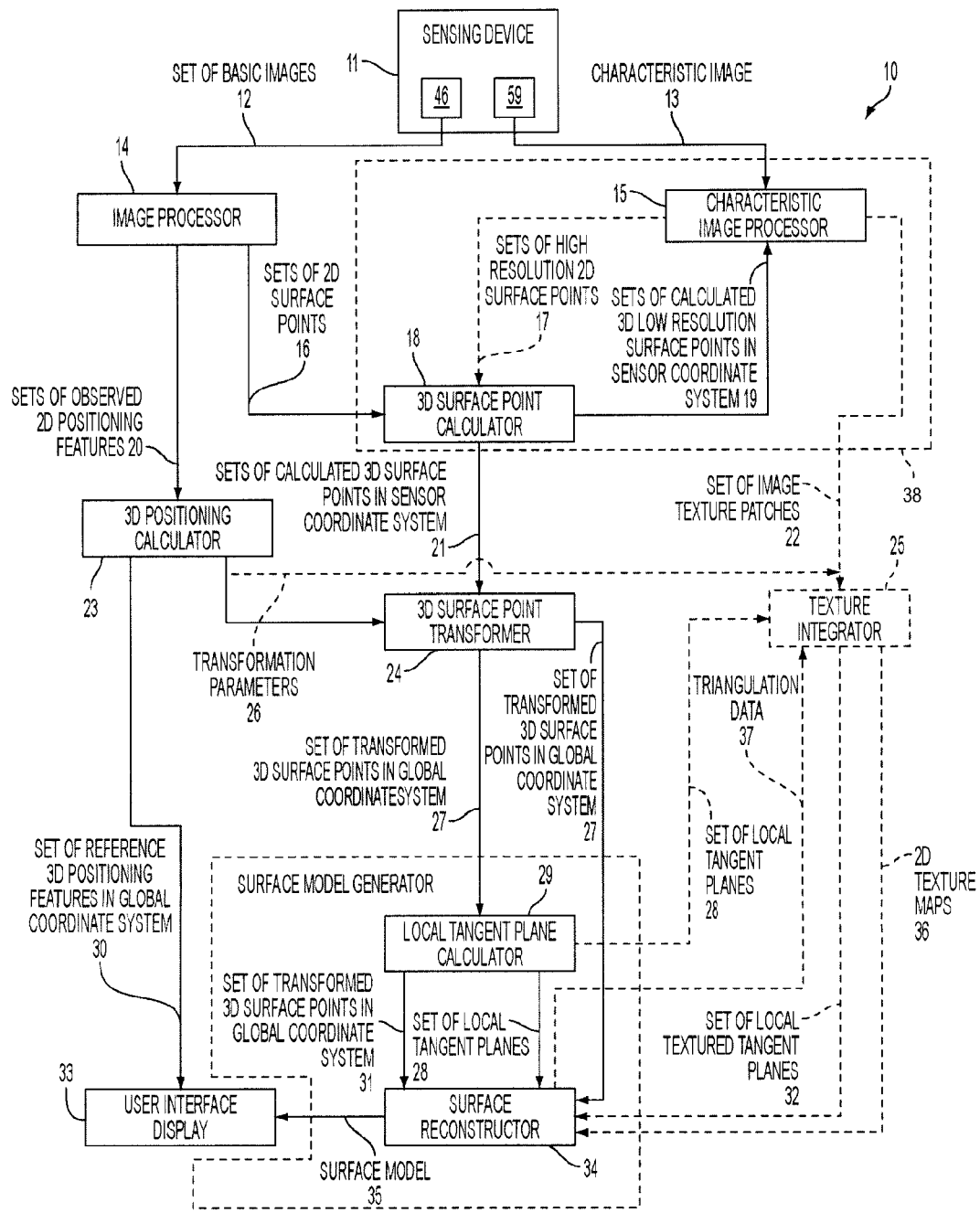
FIG. 3 is a block diagram illustrating a system for three-dimensional surface scanning.

After describing a configuration of the adapted apparatus in FIG. 1 and FIG. 2, the whole system is described from the block diagram illustrated in FIG. 3.

FIG. 1 illustrates a schematic front view of an example embodiment of a sensing device 40 that is used in the system of FIG. 3. The device 40 comprises two basic objectives and light detectors, herein referred to as the basic cameras 46. In this embodiment, the basic cameras 46 are progressive scan digital cameras. As will be readily understood by those skilled in the art, a wide variety of objective and light detecting devices in addition to such cameras are suitable for use in implementing the invention, and doubtless others will hereafter be developed. The two basic cameras 46 have their centers of projection separated by a distance D1 52, namely the baseline, and compose a passive stereo pair of cameras. The field of view of these basic cameras 46 can be, for example 60 degrees, and they can be monochromic cameras.

A laser pattern projector 42 is typically positioned at a distance D3 56 from the baseline of the stereo pair to compose a compact triangularly-configured structure leading to two additional active sensors, themselves consisting in the first case of the left camera and the laser pattern projector and, in the second case of the right camera and the laser pattern projector. For these two additional active stereo pairs, the baseline D2 54 is depicted in FIG. 1. The laser pattern projector 42 can be a class II laser which is eye-safe. It can project a red crosshair pattern. The fan angle of the laser pattern projector 42 can be 45 degrees.

In the configuration of FIG. 1, the sensing device further comprises light sources 50. The light source may consist of two sets of LEDs distributed around the basic cameras 46. In this embodiment, the light sources 50 are positioned as close as possible to the optical axes of the cameras 46 in order to capture a stronger signal from the retro-reflective targets. Typically, the light sources 50 are provided as ring lights surrounding the basic cameras 46. For example, in the color scanning device, a ring light including 8 white LEDs can be used. In the high resolution scanning device, a ring light including 4 red LEDs can be used. The light sources 50 illuminate retro-reflective targets 60 disposed on object 62 (see FIG. 2) and used as positioning features. The retro-reflective targets 60 can be disposed at intervals of about 10 cm on the object. The light sources 50 can further illuminate the object surface so as to allow for the observation of the colored texture.

A secondary objective and light detector, herein referred to as the characteristic camera 59, is added on the sensing device to acquire a high resolution geometry and/or color texture of the surface of the object 62. In one embodiment, the characteristic camera 59 has a high resolution light detector that captures a zoomed-in image of the object 62, i.e. zoomed-in compared to images acquired by the basic cameras 46. This high resolution characteristic camera 59 can have a field of view of 13 degrees and can be monochromic. In another embodiment, the characteristic camera 59 has a color camera that captures a color texture image of the object 62. This texture characteristic camera 59 can have a field of view of 20 degrees and can be a color camera. The characteristic camera 59 is positioned at a distance D4 58 from the baseline axis of the two basic cameras. There are thus baselines for 3D measurement between all cameras 46, 59 and the laser pattern projector 42.

It is however noted that, in further embodiments, a monochromic camera is used to acquire gray scale texture images instead of color texture image of the object. Linearly polarized filters 48 are mounted in front of the light sources 50 as well as in front of the characteristic camera 59. Combination of such filters on the light sources 50 and at the characteristic camera 59 reduces or eliminates specular highlights and preserves diffuse reflection.

The triangular configuration of the basic cameras and the laser pattern projector 42 is particularly interesting when D3 56 is such that the triangle is isosceles with two 45 degree angles and a 90 degree angle between the two laser planes of the crosshair pattern 44. With this particular configuration, the crosshair pattern is oriented such that each plane is aligned with both the center of projection of each camera as well as with the center of the images. This corresponds to the center epipolar line where the main advantage is that one laser plane (the inactive plane) will always be imaged as a straight line at the same position in the image, independently of the observed scene. Relevant 3D information may then be extracted from the deformed second plane of light in each of the two images.

The whole basic sensing device thus comprises two laser profilometers 46A-42 and 46B-42, one passive stereo pair 46A-46B, and two modules 46A-50 and 46B-50 for simultaneously capturing retro-reflective targets 60. Each laser profilometer 46A-42 and 46B-42 is defined by the combination of one of the basic cameras 46 and the laser pattern projector 42. The passive stereo pair 46A-46B is defined by the combination of the two basic cameras 46A-46B. Each module 46A-50 and 46B-50 is defined by the combination of one of the basic cameras 46 and its respective light sources 50. This configuration may be compact. The characteristic camera 59 adds three stereo combinations (i.e. 59-46A, 59-46B and 59-42). However, the characteristic camera 59 is used for capturing zoomed-in high resolution geometry or color texture images. The measurements of the two characteristics are integrated in this described embodiment.

For this example sensing device 40, the baseline D1 52 is typically around 190 mm for submillimeter accuracy at a standoff distance of 300 to 400 mm between the sensing device 40 and the object 62. The value of D3 56 is set to half of D1. By scaling D1, distances D2 automatically follow. Distance D4 58 is usually smaller than or equal to D3 for compactness. A typical value for D4 is 55 mm.

It is noted that the sensing device 40 is typically a hand-held device auto-referenced using positioning features placed on the object 62. However, the sensing device 40 is not necessarily hand-held and may be mounted on a mechanical actuator for example, and referencing may be performed otherwise using external referencing sensors or any other positioning devices. In the case where the sensing device 40 is hand-held, it is preferably manufactured in a casing which can easily be manipulated by hand. The overall weight of the hand-held sensing device 40 should therefore take into account the strength of a typical user and could be limited to, for example, 1.5 kg. Similarly, the dimensions of the hand-held sensing device 40 should allow manipulation of the sensing device during a scan and could be limited to, for example, 20 cm×30 cm×25 cm.

FIG. 2 illustrates a 3D view of the sensing device 40 positioned to observe an object 62 to be measured. One can see the formerly-described compact triangular architecture comprising two basic cameras 46 and the crosshair laser pattern projector 42. The sensing device 40 captures an image including the projected pattern 44 and a set of positioning features 60. Positioning features 60 may consist of the trace of isolated laser points or of circular retro-reflective targets. In this embodiment, the characteristic camera 59 captures a zoomed-in image of the object's surface.

Figure 6:
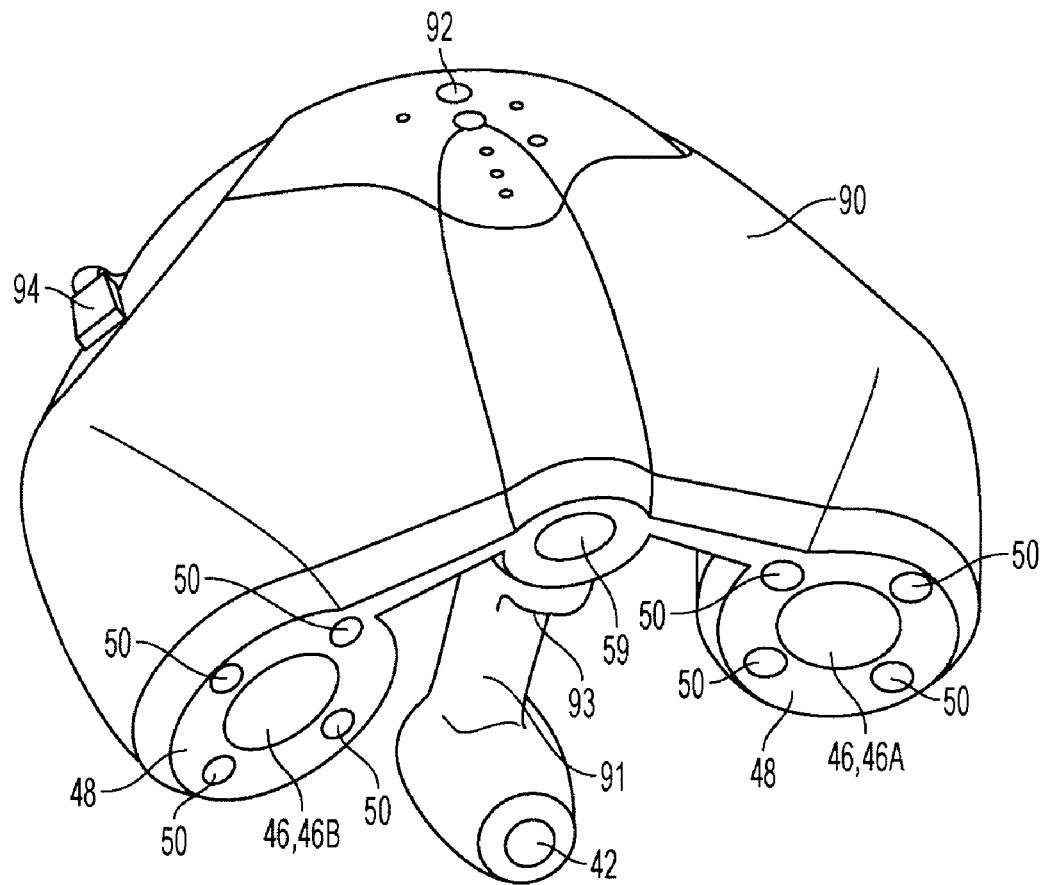
FIG. 6 shows an example hand-held sensing device with a casing.

FIG. 6 shows an example of a sensing device 40 in a casing adapted to be hand-held by a user. The casing 90 comprises a handle portion 91. The relative positions of the basic cameras 46A and 46B, of the characteristic camera 59 and of the laser pattern projector 42 are as discussed above. The handle portion 91 comprises a trigger switch 93 to activate the lights 50 on the ring lights 48 and the laser pattern projector 42. The hand-held sensing device 40 is connected to an acquisition software module, for example provided on a personal computer, using wire 94. As will be readily understood, a wireless scanning device can be provided by one skilled in the art.

Referring to FIG. 3, a 3D surface scanning system suitable for use with the sensing device 40 is generally shown at 10. Besides the integration of the whole system including the sensing device 40, one will pay particular attention to the characteristic image processor 15 and its interaction 38 with the 3D surface point calculator 18. Guided by the sets of calculated 3D low resolution surface points in sensor coordinate system, the characteristic image processor 15 can extract both the texture, i.e. the color texture in this case, and/or the geometry at finer resolutions. One will also pay special attention to the texture integrator 25 that maps the extracted texture patches 74 (see FIG. 4) in each characteristic image 13, onto the recovered partial geometry in the global coordinate system.

The 3D surface scanning system 10 of FIG. 3 implements both the texture-imaging and the high resolution geometry-imaging functions. In the 3D surface scanning system 10 of FIG. 3, both texture and geometry are acquired simultaneously. It is however noted that in another embodiment, only texture-imaging is implemented and high resolution geometry-imaging is omitted. In yet another embodiment, only high resolution geometry-imaging is implemented. In this latter case, the characteristic camera 59 is typically a non-color, i.e gray scale, camera and the texture integrator 25 is omitted. It is also noted that the 3D surface scanning system of FIG. 3 typically has options allowing a user to activate and deactivate texture-imaging and high resolution geometry-imaging functions.

Sensing Device

The system 10 comprises a sensing device 11 such as the sensing device 40 described in more details herein above with reference to FIGS. 1 and 2. The sensing device 11 collects and transmits a set of basic images 12 of the observed scene to an image processor 14. These images can be collected from the two basic cameras 46 (see FIG. 1) with different viewpoints, where each of these viewpoints has its own center of projection. The relevant information encompassed in the basic images 12 can result from the reflection of the laser pattern 44 reflected on the object's surface as well as from positioning features 60 that may be used to calculate the relative position of the sensing device 11 with respect to other frame captures. Since all images in a given frame are captured simultaneously and contain both positioning and surface measurements, synchronisation of positioning and surface measurement is implicit.

The sensing device 11 also integrates an additional camera, namely the characteristic camera 59 (see FIG. 1), whose purpose is to capture a characteristic image 13. The viewpoint of the characteristic camera 59 is known, i.e. referenced, relative to viewpoints of the basic cameras 46, and the basic cameras 46 and the characteristic camera 59 are all synchronized relative to one another. Typically, a characteristic image 13 is either an image of high resolution or a color image for instance.

In FIG. 3, the sensing device 11 was shown as comprising at least one basic camera 46 and at least one characteristic camera 59, the basic camera(s) 46 generating the set of basic images 12 and the characteristic camera 59 generating the characteristic image 13.

It will be noted and readily understood by one skilled in the art that instead of doing stereo vision from a pair of cameras, it would be possible to do "stereo from motion" or "3D from motion" and thus use a single camera for positioning.

Image Processor

The image processor 14 extracts positioning features and surface points from each basic image 12. For each basic image 12, a set of observed 2D positioning features 20 along with sets of 2D surface points 16, including their connectivity, are output. The connectivity for each of these sets actually defines 2D curve segments. The surface points and features are identified in the basic images 12 based on their intrinsic characteristics. The pixels associated with these features are contrasting with respect to the background and may be isolated with simple image processing techniques before estimating their position using centroid or ellipse fitting (see E. Trucco and A. Verri, "Introductory techniques for 3-D computer vision", Prentice Hall, 1998). Using circular targets allows one to extract surface normal orientation information from the equation of the fitted ellipse, therefore facilitating sensor positioning. The sets of surface points are discriminated from the positioning features since the laser pattern projector produces contrasting curve sections in the images and thus presents a different 2D shape. The image curve sections are isolated as single blobs and for each of these blobs, the curve segment is analyzed for extracting a set of points along the curve with sub-pixel precision. This is accomplished by convolving a differential operator across the curve section and interpolating the zero-crossing of its response. This latter operation is typically referred to as peak detection.

For a crosshair laser pattern, one can benefit from the architecture of the apparatus described herein. In such a configuration with two basic cameras 46 and a crosshair pattern projector 42, the basic cameras 46 are aligned such that one among the two laser planes produces a single straight line in each basic camera 46 at a constant position. This is the inactive laser plane for a given camera 46. These inactive laser planes are opposite for both cameras 46. This configuration, proposed by Hébert (see P. Hébert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12) greatly simplifies the image processing task. It also simplifies the assignment of each set of 2D surface points to a laser plane of the crosshair along with their connectivity in 3D for defining curve segments.

While the sets of 2D surface points 16 follow one path in the system to recover the whole scan of the surface geometry, the sets of observed 2D positioning features 20 follow a second path and are used to recover the relative position of the sensing device 11 with respect to the object's surface. However, these two types of sets are further processed for obtaining 3D information in the sensor coordinate system as well as in the global coordinate system as described thereafter.

3D Surface Point Calculator

The 3D surface point calculator 18 takes as first input the extracted sets of 2D surface points 16. These points can be associated with a section of the laser projected pattern, for instance one of the two planes for the crosshair pattern 44. When the association is known, each of the 2D points can be transformed into a 3D point in the sensor coordinate system by intersecting the corresponding cast ray and the equation of the laser plane. The equation of the ray is obtained from the projection matrix of the associated camera. The laser plane equation can be obtained using a pre-calibration procedure (see P. Hebert, "A Self-Referenced Hand-Held Range Sensor". in proc. of the 3rd International Conference on 3D Digital Imaging and Modeling (3DIM 2001), 28 May-1 Jun. 2001, Quebec City, Canada, pp. 5-12). It is also possible to obtain a 3D point directly from a 2D point by exploiting a table look-up after calibrating the sensor 11 with an accurate translation stage for instance. Both approaches are adequate. In the first case, the procedure is simple and there is no need for sophisticated equipment but it requires a very good estimation of the cameras' intrinsic and extrinsic parameters.

It is also possible to avoid associating each 2D point to a specific structure of the laser pattern. This is particularly interesting for more complex or general patterns. In this case, it is still possible to calculate 3D surface points using the fundamental matrix and exploiting the epipolar constraint to match points. When this can be done without ambiguity, triangulation can be calculated from the known projection matrices of the cameras to obtain a 3D point in the sensor coordinate system.

The 3D surface point calculator 18 feeds these sets of calculated 3D low resolution surface points in sensor coordinate system 19 to the characteristic image processor 15 in order to facilitate the extraction of high resolution 2D points by the characteristic image processor 15 as described thereafter. The sets of calculated 3D surface points are said to be of low resolution in order to distinguish them within the whole sets of output calculated 3D surface points in sensor coordinate system 21 that comprise both these sets of 3D low resolution surface points in sensor coordinate system 19 and sets of high resolution surface points in sensor coordinate system 17.

In order to calculate the sets of high resolution surface points, the 3D surface point calculator 18 further takes as input sets of high resolution 2D surface points 17. The same procedure used for calculating low resolution 3D surface points described here above is used. This procedure requires either a very good estimation of the characteristic camera's intrinsic and extrinsic parameters or exploiting a table lookup.

The 3D surface point calculator 18 outputs the whole sets of calculated 3D surface points in the sensor coordinate system 21. These sets can be unorganized sets or be organized such that 3D points associated with connected segments in the images are grouped for estimating 3D curve tangents by differentiation. These segments can be further grouped into high and low resolution segments according to their source images. This information can be exploited by the local tangent plane calculator 29 or the surface reconstructor 34 for locally adapting the quality of the recovered surface model 35.

Characteristic Image Processor

The characteristic image processor 15 takes as input a characteristic image 13 which is an image obtained from the characteristic camera 59 (see FIG. 1) which is typically mounted with a lens of higher focal length. Typically, the characteristic image 13 only covers a small portion of the scan (for better resolution) which does not necessarily include a positioning feature or the whole pattern reflected on the object. Accordingly, the referencing is known from the basic images 12, and the spatial relationship between the characteristic image 13 and the basic images 12 is known from camera calibration. The characteristic image 13 can be monochromic or colored. While in the former case the extracted characteristics are essentially of geometry or of monochrome texture, in the latter case it further comprises color texture characteristics.

For calculating high resolution geometry information, namely sets of high resolution characteristic 2D surface points, the characteristic image processor 15 projects the sets of 3D low resolution surface points 19 in sensor coordinate system into the characteristic camera 59's coordinate system whose intrinsic parameters are pre-calibrated and whose spatial relationship with respect to the sensor coordinate system, namely its extrinsic parameters, were also obtained through camera calibration. The projected sets of connected 3D points project sets of segments into the characteristic image 13. From these obtained approximate locations in the characteristic image coordinate system, local image processing is applied to extract 2D corresponding points from the imaged laser trace.

Figure 5:
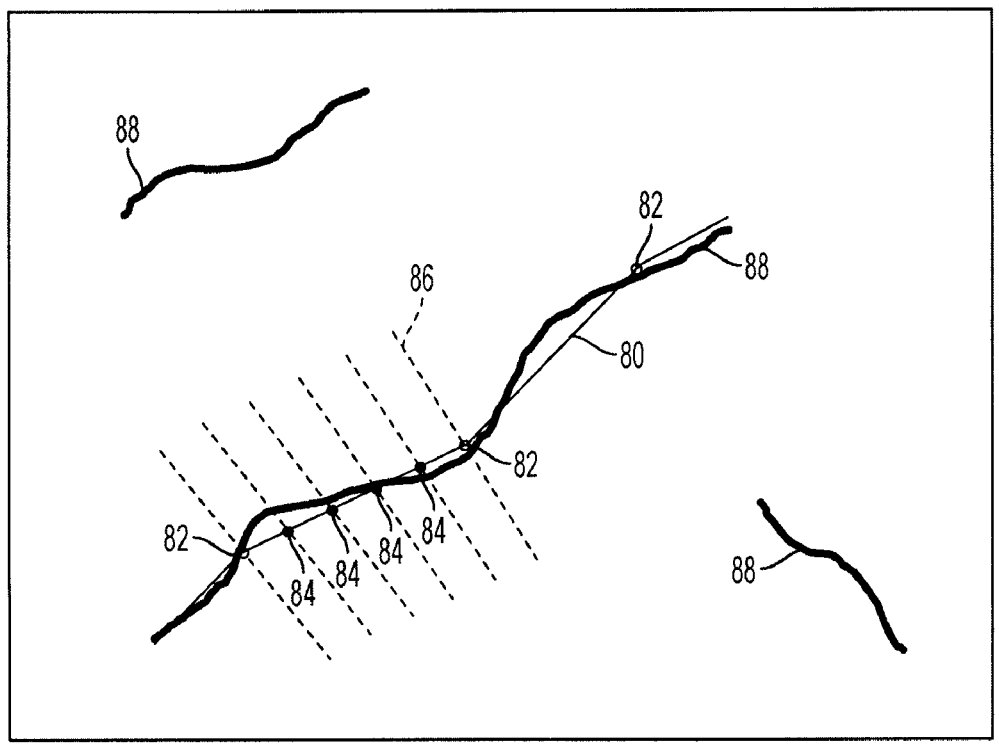
FIG. 5 illustrates the details of the guided extraction of the fine resolution laser trace in the characteristic image.

To do so, each set of connected 2D points resulting from the projection provides a piecewise linear approximation of the curve segment, namely a polyline 80. FIG. 5 illustrates the details of the guided extraction of the laser trace 88 in the characteristic image. A piecewise linear approximation, namely a polyline 80, is superimposed onto the characteristic image 13 after projection of the corresponding connected set of calculated 3D low resolution surface points, initially obtained from the basic images. The projections of these points are the vertices 82 of the polyline 80. The polyline 80 is then resampled. In FIG. 5, one section is illustrated with a sampling factor of 5 leading to 4 additional points 84 per linear section. At each point 82 and 84 along the polyline 80, the characteristic image is sampled along normal directions 86. Typically, 20 to 30 image samples are calculated along these directions, leading to a 1D signal. The distance between samples is one pixel's width. From this 1D curve, the subpixel peak position is estimated, thus providing a high resolution 2D surface point. Finally, the peaks of the laser trace 88 in the characteristic image are detected using these signals. One obtains a refined position of the peaks where low resolution polylines project. Gathering these 2D surface points for each connected set leads to the output of sets of high resolution 2D surface points 17.

It is noted that it is also possible to estimate the local normal direction from the local characteristic image signal.

Figure 4A:
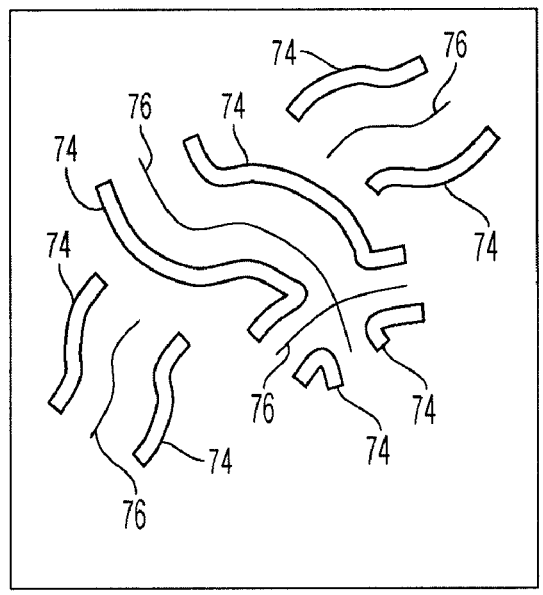
FIG. 4 illustrates the areas on an object's surface, where the texture is extracted nearby the laser trace.
Figure 4B:
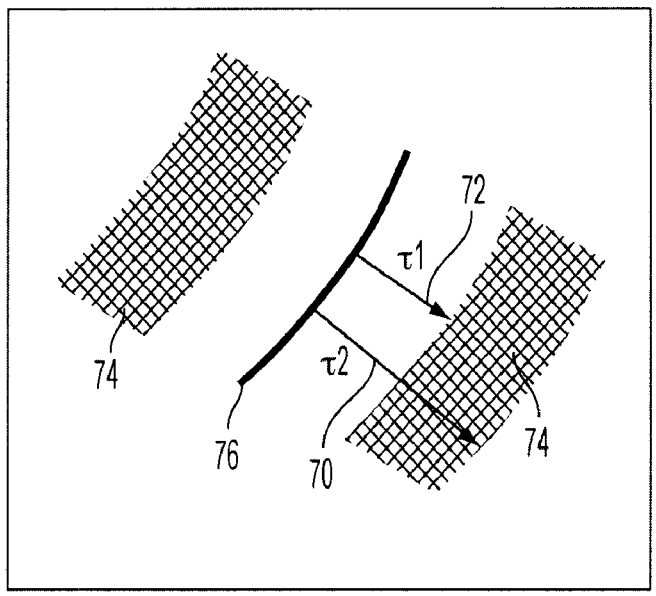

Geometry is one characteristic of an object surface. Other characteristics that can be processed independently are the gray scale texture and color texture. It is noted that while color texture acquisition and processing is assumed in the following description, gray scale texture acquisition and processing is also possible. The principle remains the same; the local characteristic extraction is guided using the projection of the initial sets of 3D low resolution surface points 19 in the sensor coordinate system. If there is a laser trace nearby the polyline, then the color of the pixels is collected in an area at proximity on both sides of the laser trace. FIG. 4 illustrates the recovered texture patch 74 nearby the laser trace in the characteristic image. In the right part of the figure, a section is zoomed in. The two distances $\tau 1$ 72 and $\tau 2$ 70 from the laser trace delimit the width of the recovered texture nearby the laser trace. The color is recovered within a distance interval ranging between $\tau 1$ 72 and $\tau 2$ 70. $\tau 1$ 72 is set such as to avoid color interference with the laser lighting; in the one embodiment a typical value for $\tau 1$ 72 is 10 pixels and 25 pixels for $\tau 2$ 70. To each of these pixels compositing the local texture is assigned the (x,y,z,r,g,b) coordinates of the closest surface point on the recovered curve segment or alternatively on the polyline when the geometry is not refined. The characteristic image processor 15 outputs a set of image texture patches as texture bitmaps augmented with 3D coordinates in the sensor coordinate system. For a given frame, the set of image texture patches 74 is fed to the texture integrator 25 whose role is to merge all image texture patches collected from all viewpoints. The texture integrator 25 will be described after the local tangent plane calculator.

3D Positioning Calculator

The task of the 3D positioning calculator 23, is to provide transformation parameters 26 for each set of calculated 3D surface points 21 and set of image texture patches. These transformation parameters 26 make it possible to transform 3D surface points 21 or (x,y,z) coordinates for each pixel of the image texture patches 22 into a single global coordinate system while preserving the structure; the transformation is rigid. In this embodiment, this is accomplished by building and maintaining a set of reference 3D positioning features in the global coordinate system 30. The positioning features can be a set of 3D points, a set of 3D points with associated surface normal or any other surface characteristic. It is noted that while in this embodiment auto-referencing using positioning features is used, in another embodiment other positioning systems may be used. External referencing sensors or other positioning devices may be used for example.

In the embodiment of FIG. 3, it is assumed that all positioning features are 3D points, represented as column vectors $[x, y, z]^T$ containing three components denoting the position of the points along the three coordinate axes.

Since the sensing device 11 is calibrated, matched positioning features between viewpoints of the basic cameras 46 are used to estimate their 3D position. The sets of observed 2D positioning features are matched using the epipolar constraint to obtain non ambiguous matches. The epipolar lines are calculated using the fundamental matrix that is calculated from the calibrated projection matrices of the basic cameras 46. Then, from the known projection matrices of the cameras 46, triangulation is applied to calculate, for each frame, a single set of 3D positioning features in the sensor coordinate system.

At the beginning of a scanning session, the set of reference 3D positioning features 30 is empty. As the sensing device 11 provides the first set of measurements, the features are copied into the set of reference 3D positioning features 30 using the identity transformation. This set thus becomes the reference set for all subsequent sets of reference 3D features and this first sensor position defines the global coordinate system into which all 3D surface points are aligned.

After creation of the initial set of reference 3D positioning features, subsequent calculated sets of positioning features are first matched against the reference set 30. The matching operation is divided into two tasks: i) finding corresponding features between the set of calculated 3D positioning features in the sensor coordinate system for the current frame and the set of reference 3D features in the global coordinate system, and ii) computing the transformation parameters 26 of the optimal rigid 3D transformation that best aligns the two sets. Once the parameters have been computed, they are used to transform calculated 3D positioning features of the current frame, calculated 3D surface points in sensor coordinate system 21 and image texture patches 22, thus aligning all of them into the global coordinate system.

After calculating the set of reference 3D positioning features, R, the set of calculated 3D positioning features in the current frame, O, is calculated from the sets of observed 2D positioning features 20, $P_1$ and $P_2$, obtained from cameras 1 and 2. The 3D coordinates are obtained by triangulation. Matching these sets of 3D positioning features is the problem of finding two subsets $O_m \subset O$ and $R_m \subset R$, containing N features each, such that all pairs of points $\overline{(o_i, r_i)}$ with $o_i \in O_m$ and $r_i \in R_m$, represent the same physical features. Finding these subsets is accomplished by finding the maximum number of segments of points $\overline{(o_i o_j; r_i r_j)}$, such that $$|\|o_i - o_j\| - \|r_i - r_j\|| \leq \epsilon \text{ for all } i,j \in \{1, \ldots, N\}, i \neq j, \quad (1)$$

where $\epsilon$ is a predefined threshold which is set to correspond to the accuracy of the sensing device. This constraint imposes that the difference in distance between a corresponding pair of points in the two sets be negligible.

This matching operation is solved as a combinatorial optimization problem where each segment of points from the set O is progressively matched against each segment of points in the set R. Each matched segment is then expanded by forming an additional segment using the remaining points in each of the two sets. If two segments satisfy the constraint (1), a third segment is formed and so on as long as the constraint is satisfied. Otherwise the pair is discarded and the next one is examined. The solution is the largest set of segments satisfying (1). Other algorithms (see for example M. Fischler and R. Bolles, (1981) "Random sample consensus: A paradigm for model fitting with applications to image analysis and automated cartography", Communications of the Assoc. for Computing Machinery, (June 1981), vol. 24, no. 6, pp. 381-395.) can be used for the same purpose.

As long as the number of elements in the set of reference 3D positioning features 30 is relatively low (typically less than fifteen), the computational complexity of the above approach is acceptable for real-time operation. In practice however, the number of reference features can easily reach several hundreds of positioning features. Since the computational complexity grows exponentially with the number of features, the computation of corresponding features can become too slow for real-time applications. The problem is solved by noting that the number of positioning features that are visible from any particular viewpoint is small, being limited by the finite field of view of the sensing device 11.

This means that if the calculated features for a given frame can be matched against reference features 30, then the matched features from the reference set should be located in a small neighbourhood whose size is determined by the size of the set of calculated features. This also means that the number of points in this neighbourhood should be small as well (typically less than fifteen). To exploit this property for accelerating matching, the above method is modified as follows. Prior to matching, a set of neighbouring features $[N_i]$ is created for each reference feature. After the initial segment of points is matched, it is expanded by adding an additional segment using only points in the neighbourhood set $[N_i]$ of the first matched feature. By doing so, the number of points used for matching remains low regardless of the size of the reference set 30, thus preventing an exponential growth of the computational complexity.

Alternatively, exploiting spatial correlation of sensing device position and orientation can be used to improve matching speed. By assuming that the displacement of the sensing device is small with respect to the size of the set of positioning features, matching can be accomplished by finding the closest reference feature for each observed positioning feature. The same principle can be used in 2D, that is, by finding closest 2D positioning features.

Once matching is done, the two sets need to be aligned by computing the optimal transformation parameters [M T], in the least-squares sense, such that the following cost function is minimized:

$$\sum_{i=1}^{N} \|r_i - Mo_i + T\|^2, \quad (2)$$

for all $i \in \{1, \ldots, N\}$.

The transformation parameters consist of a 3×3 rotation matrix M and a 3×1 translation vector T. Such a transformation can be found using dual quaternions as described in M. W. Walker, L. Shao and R. A. Volz, "Estimating 3-D location parameters using dual number quaternions", CVGIP: Image Understanding, vol. 54, no. 3, November 1991, pp. 358-367. In order to compute this transformation, at least three common positioning features have to be found. Otherwise both positioning features and surface points are discarded for the current frame.

An alternative method for computing the rigid transformation is to minimize the distance between observed 2D positioning features 20 and the projections of reference 3D positioning features 30. Using the perspective projection transformation Π, the rigid transformation [M T] that is optimal in the least-squares sense is the transform that minimizes:

$$\sum_{i=1}^{N} \|\Pi M^{-1}(r_i - T) - p_i\|, \quad (3)$$

for all $i, j \in \{1, \ldots, N\}$, where $p_i \in P_1$ or $p_i \in P_2$ are observed 2D features that correspond to the 3D observed feature $o_i \in O_m$. The rigid transformation [M T] can be found by minimizing the above cost function using an optimization algorithm such as the Levenberg-Marquardt method.

Once the rigid transformation is computed, the set of calculated 3D positioning features is transformed from the sensor coordinate system to the global coordinate system. The transformed 3D positioning features are used to update the set of reference 3D positioning features 30 in two ways. First, if only a subset of observed features has been matched against the set of reference features, the unmatched observed features represent newly observed features that are added to the reference set. The features that have been re-observed and matched can be either discarded (since they are already in the reference set) or used to improve, that is, filter the existing features. For example, all observations of the same feature can be summed together in order to compute the average feature position. By doing so, the variance of the measurement noise is reduced thus improving the accuracy of the positioning system.

3D Surface Point Transformer

The processing steps for the surface points are simple once the 3D positioning calculator 23 makes the transformation parameters 26 available. The sets of calculated 3D surface points in the sensor coordinate system 21 provided by the 3D surface point calculator 18 are then transformed by the 3D surface point transformer 24 using the rigid transformation parameters 26 M and T. The resulting set of transformed 3D surface points in the global coordinate system 27 is thus naturally aligned in the same coordinate system with the set of reference 3D positioning features 30. The final set of transformed 3D surface points in global coordinate system 27 can be visualized, or it can be fed to local tangent plane calculator 29 before the surface reconstructor 34. The surface reconstructor will estimate a continuous non-redundant and possibly filtered surface model 35 representation that is displayed optionally with the superimposed set of reference 3D positioning features 30.

Local Tangent Plane Calculator

The local tangent plane calculator 29 takes as input the set of transformed 3D surface points in the global coordinate system 27 and provides local estimates of the 3D tangent planes on the object's surface. Although this process could be integrated within the surface reconstructor 34, it is here separated to better illustrate that a continuous surface representation is not required to provide local tangent plane estimates over an object's surface. One possibility for obtaining the local tangent plane estimates in real-time consists in defining a regular volumetric grid and accumulating the 3D surface points within each voxel. From the 3D accumulated points, a tangent plane can be calculated for each voxel based on the 3D points that lie within the voxel or within a volume circumventing the voxel. This type of approach is used in T. P. Koninckx, P. Peers, P. Dutré, L. J. Van Gool, "Scene-Adapted Structured Light", in proc. of Computer Vision and Pattern Recognition (CVPR 2005), vol. 2, San Diego, USA, 2005, pp. 611-618, as well as in S. Rusinkiewicz, O. A. Hall-Holt, M. Levoy, "Real-time 3D model acquisition" in proc. of ACM SIGGRAPH 2002, San Antonio, USA, pp. 438-446, or in D. Tubic, P. Hébert, D. Laurendeau, "3D surface modeling from curves", Image and Vision Computing, August 2004, vol. 22, no. 9, pp. 719-734.

Once this initial non continuous geometry has locally stabilized, that is for instance once the two smallest eigenvalues of the 3D point covariance matrix are similar while the third eigenvalue is significantly lower within voxels, the parameters of the local planes are calculated from the two first moments of their covariance matrix. The span of each local tangent plane is typically a circle whose diameter is between 1 and 2 voxel's diagonal length. The local tangent plane calculator outputs a set of local tangent planes 28 including their parameters and spans as well as the set of transformed 3D surface points in the global coordinate system 31 that are copied from 27.

The local tangent plane calculator 29 can include a tangent plane resolution adjuster for adjusting a resolution of the calculation of the set of local tangent planes. The adjuster can be a manual or automatic adjuster allowing modification of a resolution parameter for the local tangent plane calculator 29.

Texture Integrator

The texture integrator 25 collects the set of image texture patches 22 recovered in all frames and further takes as input the set of local tangent planes 28 that have stabilized. It is worth mentioning that the local tangent planes are fed independently when they become available. This makes it possible to apply the process incrementally as the surface is scanned; it is not necessary to wait for the complete set of frames before proceeding.

Each local tangent plane section is tessellated as a local image with a selected resolution that can be set independently of the geometry resolution. We will refer to these cells as texels. The texture integrator further takes as input the transformation parameters 26 from the 3D positioning calculator 23. Using these transformation parameters, the spatial relationship between the current sensor's coordinate system and the global coordinate system is known and thus, the set of image texture patches 22 can be mapped to the local tangent plane by retroprojection. Each pixel in the set of texture image patches contributes to updating its corresponding local tangent plane. For that purpose, all texels in a local tangent plane are updated from the pixels that map onto the local plane. Each pixel contributes to all texels based on a weight decreasing with distance. Texels are obtained as the weighted average of all contributing pixels, from all frames.

The texture integrator 25 also applies color intensity compensation. Actually, it is preferable to obtain stable color measurements before integrating them into texels. The color intensity will typically vary with the square of the distance with respect to the light sources 50 and the cosine of the angle between the light sources 50 and the tangent plane normal. In one embodiment, there are eight light sources 50 that are distributed in the periphery of each of the two basic cameras 46's objectives. Furthermore, the use of polarizing filters 48 in front of the light sources 50 and the characteristic camera 59 eliminates specular reflections and preserves the diffuse reflection. It is thus possible to only consider the angle between the light sources 50 and the surface; the angle between the surface and the characteristic camera 59 may be neglected for the color intensity compensation. The light source positions are known in the sensor coordinate system, from the sensor design or from calibration. Moreover, since each light source combines additively, the color irradiance on each texel can be normalized between frames assuming the sources are identical or by calibrating their intensity. The compensation process also uses photometric camera calibration such as the calibration proposed in P. E. Debevec and J. Malik. "Recovering High Dynamic Range Radiance Maps from Photographs", in proc. of ACM SIGGRAPH 1997, Los Angeles, USA, pp. 369-378. What is produced by the texture integrator 25 is a set of local textured tangent planes 32.

Alternatively, 2D texture maps 36 with corresponding surface coordinates mapping information can be prepared by the texture integrator 25 and provided to the surface reconstructor 34. It may use triangulation data 37 as a feedback from the surface reconstructor 34 to produce the 2D texture maps 36.

Surface Reconstructor

The surface reconstructor 34 takes as input the set of transformed 3D surface points in a global coordinate system 31 and the set of local textured tangent planes 32 and calculates a surface model. Alternatively, it can use the 2D texture maps 36 with corresponding surface coordinates mapping information. It is worth noting that local tangent planes can also be obtained from the reconstructed surface. From the set of surface points, a continuous representation of the surface geometry can be calculated using the method described in U.S. Pat. No. 7,487,063 or in B. Curless, M. Levoy, "A Volumetric Method for Building Complex Models from Range Images" in proc. of the ACM SIGGRAPH 1996, New Orleans, USA, pp. 303-312 for instance. The two approaches exploit a volumetric representation. The former approach can benefit from the knowledge of local tangent planes for more efficiency. The volumetric representation is then transformed into a triangulated surface representation. For that purpose, the marching cubes algorithm can be used (see for example W. E. Lorensen, and H. E. Cline, "Marching Cubes: A High Resolution 3D Surface Construction Algorithm", in proc. of the ACM SIGGRAPH 87, Los Angeles, USA, vol. 21, no. 4, pp. 163-170). Once the triangulated surface is obtained, the set of local textured planes are mapped to the triangulated surface with their overlapping areas blended for obtaining a continuous surface texture.

The surface reconstructor 34 can include a model resolution adjuster for adjusting a resolution of the cumulation of the set of transformed 3D surface points. The adjuster can be a manual or automatic adjuster allowing modification of a resolution parameter for the surface reconstructor 34.

When the scanning device 40 is used for texture scanning, bitmaps of 200 to 250 Dots Per Inch (DPI) can be associated to local tangent planes. The texture color can be provided in 24 bits, sRGB-calibrated. The depth of the field can be, for example, 30 cm. The texture sensing device 40 can take, for example, about 18,000 measures per second with a geometry resolution of 0.1 mm.

When the scanning device 40 is used for high resolution scanning, the high resolution voxel resolution can be 0.25 mm. In comparison, the voxel resolution for the scanning device 40 which does not have high resolution capability can be 1 mm. The depth of the field can be, for example, 30 cm. The high resolution sensing device 40 can take, for example, about 25,000 measures per second with a resolution in x, y, z of 0.05 mm.

The various devices and components described, including for example sensors such as basic cameras 48, laser projector 42, and characteristic camera 59 can be used to generate input data useable by the various processors shown in FIG. 3.

While illustrated in the block diagrams as groups of discrete components communicating with each other via distinct data signal connections, it will be understood by those skilled in the art that the preferred embodiments can be provided by combinations of hardware and software components, with some components being implemented by a given function or operation of a hardware or software system, and many of the data paths illustrated being implemented by data communication within a computer application or operating system or can be communicatively linked using any suitable known or after-developed wired and/or wireless methods and devices. Sensors, processors and other devices can be co-located or remote from one or more of each other. The structure illustrated is thus provided for efficiency of teaching the present preferred embodiment.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A system for obtaining data representing surface points of an object, said system comprising:

a sensing device having a pattern projector for providing a projected pattern on a surface of said object, at least one basic camera for acquiring basic 2D image data representing a basic 2D image of at least a portion of said object at a basic resolution, and a characteristic camera for acquiring characteristic image data representing a characteristic image of at least a portion of said object, said characteristic camera being at least one of a texture camera and a high resolution camera, said texture camera being a camera adapted to capture characteristic texture information about said portion of said object, said high resolution camera being a camera adapted to capture high resolution information about said portion of said object at a high resolution, said high resolution being higher than said basic resolution, said projected pattern being apparent on said basic image, at least part of said projected pattern being apparent on said characteristic image, a spatial relationship of said basic camera, said pattern projector and said characteristic camera in a sensor coordinate system being known, said characteristic camera and said basic camera being synchronized to allow said basic camera and said characteristic camera to respectively capture said basic 2D image data and said characteristic image data simultaneously while said pattern is projected on said surface of said object by said pattern projector;

a basic image processor for extracting, from said basic 2D image data, 2D point data representing at least one set of 2D surface points provided from a reflection of said projected pattern on said surface;

a 3D surface point calculator for calculating a set of 3D surface points in said sensor coordinate system using said 2D point data representing set of 2D surface points;

a characteristic image processor for
    mathematically projecting said set of 3D surface points onto said characteristic image data to obtain a location of said 3D surface points in said characteristic image data,
    guiding an extraction of characteristic data for said set of 3D surface points using said projected 3D surface points in said characteristic image data, said guiding including local image processing if said characteristic camera is said high resolution camera and said guiding avoiding interference by said projected pattern on said extracted characteristic data if said characteristic camera is said texture camera, and
    obtaining, using said characteristic data of said extraction, at least one of a refined position of said 3D surface points if said characteristic camera is said high resolution camera and a texture of said 3D surface points if said characteristic camera is said texture camera.

2. The system as claimed in claim 1, further comprising a positioning system for obtaining transformation parameters, said transformation parameters representing a spatial relationship between said sensor coordinate system and a global coordinate system; and a 3D surface point transformer for transforming said set of 3D surface points into a set of transformed 3D surface points in said global coordinate system using said transformation parameters.

3. The system as claimed in claim 2, wherein the positioning system comprises:

a set of target positioning features on said object, each of said target positioning features being provided at a fixed position on said object, a global coordinate system being defined using said target positioning features, at least a portion of said set of target positioning features being apparent on said basic 2D image, said set of target positioning features to be extracted from said basic 2D image by said image processor; and wherein said system further comprises a 3D positioning calculator for calculating said transformation parameters using said positioning system.

4. The system as claimed in claim 3, further comprising:

a surface reconstructor for cumulating the set of transformed 3D surface points and said characteristic data for said 3D surface points to provide a 3D surface model of said object.

5. The system as claimed in claim 4, wherein said surface reconstructor comprises a model resolution adjuster for adjusting a resolution of said cumulating the set of transformed 3D surface points.

6. The system as claimed in claim 4, further comprising:

a local tangent plane calculator for calculating a set of local tangent planes from the set of transformed 3D surface points in the global coordinate system, said surface reconstructor using said local tangent planes to provide said 3D surface model of said object.

7. The system as claimed in claim 6, wherein said local tangent plane calculator comprises a tangent plane resolution adjuster for adjusting a resolution of said calculating a set of local tangent planes.

8. The system as claimed in claim 1, wherein said characteristic camera is a texture camera, said characteristic image is a texture image, wherein said characteristic image processor comprises a texture image processor and wherein said characteristic data is texture data obtained in texture patches.

9. The system as claimed in claim 6, wherein said characteristic camera is a texture camera, said characteristic image is a texture image, wherein said characteristic image processor comprises a texture image processor and wherein said characteristic data is texture data obtained in image texture patches.

10. The system as claimed in claim 9, further comprising:

a texture integrator for mapping and accumulating the set of texture patches onto the set of local tangent planes to produce one of a set of 2D texture maps and a set of local textured tangent planes.

11. The system as claimed in claim 1, wherein said characteristic camera is a high resolution camera, said characteristic image is a high resolution 2D image, wherein said characteristic image processor comprises a high resolution image processor, and wherein said characteristic data is high resolution 2D surface points.

12. The system as claimed in claim 1, wherein said characteristic camera is a high resolution texture camera, said characteristic image is a high resolution texture image, wherein said characteristic image processor comprises a texture image processor and a high resolution image processor and wherein said characteristic data comprises high resolution 2D surface points and texture data obtained in image texture patches.

13. A method for obtaining data representing surface points of an object, said method comprising:

obtaining basic 2D image data representing a basic 2D image of at least a portion of said object using at least one basic camera at a basic resolution, a projected pattern projected on a surface of said object being apparent on said basic image;

obtaining characteristic image data representing a characteristic image of at least a portion of said object using a characteristic camera, at least part of said projected pattern projected on said surface of said object being apparent on said characteristic image, said characteristic camera being at least one of a texture camera and a high resolution camera, said texture camera being a camera adapted to capture characteristic texture information about said portion of said object, said high resolution camera being a camera adapted to capture high resolution information about said portion of said object at a high resolution, said high resolution being higher than said basic resolution;

extracting, from said basic 2D image data, 2D point data representing at least one set of 2D surface points provided from a reflection of said projected pattern on said surface;

calculating a set of 3D surface points in a sensor coordinate system using said 2D point data representing set of 2D surface points, a spatial relationship of said basic camera, said pattern projector and said characteristic camera in said sensor coordinate system being known; and mathematically projecting said set of 3D surface points onto said characteristic image data to obtain a location of said 3D surface points in said characteristic image data;

guiding an extraction of characteristic data for said set of 3D surface points using said projected 3D surface points in said characteristic image data, said guiding including local image processing if said characteristic camera is said high resolution camera and said guiding avoiding interference by said projected pattern on said extracted characteristic data if said characteristic camera is said texture camera, and obtaining, using said characteristic data of said extraction, at least one of a refined position of said 3D surface points if said characteristic camera is said high resolution camera and a texture of said 3D surface points if said characteristic camera is said texture camera.

14. The method as claimed in claim 13, wherein said basic 2D image and said characteristic image are obtained using a sensing device having a pattern projector for providing said projected pattern on said surface of said object, at least one basic camera for acquiring a basic 2D image of said object, and a characteristic camera for acquiring a characteristic image of said object, a spatial relationship of said basic camera, said pattern projector and said characteristic camera in a sensor coordinate system being known, said characteristic camera and said basic camera being synchronized to allow said basic camera and said characteristic camera to respectively capture said basic 2D image data and said characteristic image data simultaneously while said pattern is projected on said surface of said object by said pattern projector.

15. The method as claimed in claim 13, further comprising obtaining transformation parameters, said transformation parameters representing a spatial relationship between said sensor coordinate system and a global coordinate system, transforming said set of 3D surface points into a set of transformed 3D surface points in said global coordinate system using said transformation parameters.

16. The method as claimed in claim 15, further comprising:
cumulating the set of transformed 3D surface points to provide a 3D surface model of said object.

17. The method as claimed in claim 16, further comprising:
calculating a set of local tangent planes from the set of transformed 3D surface points in the global coordinate system, using said local tangent planes to provide said 3D surface model of said object.

18. The system as claimed in claim 1, wherein said pattern projector of said sensing device is a laser pattern projector.

* * * * *